US008369680B2

(12) United States Patent
Whiteing (10) Patent No.: US 8,369,680 B2
(45) Date of Patent: Feb. 5, 2013

(54) SYSTEM AND METHOD FOR SYNCHRONIZING BROADCAST VIDEO WITH A SECONDARY AUDIO SOURCE

(75) Inventor: Stephen Whiteing, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 352 days.

(21) Appl. No.: 12/632,189

(22) Filed: Dec. 7, 2009

(65) Prior Publication Data

US 2011/0135282 A1 Jun. 9, 2011

(51) Int. Cl.
H04N 5/932 (2006.01)
(52) U.S. Cl. .......................................... 386/201; 386/219
(58) Field of Classification Search .......................... None
See application file for complete search history.

(56) References Cited

U.S. PATENT DOCUMENTS

| 5,440,351 | A * | 8/1995 | Ichino | 348/729 |
| 2002/0080163 | A1 * | 6/2002 | Morey | 345/727 |
| 2003/0179317 | A1 * | 9/2003 | Sigworth | 348/515 |
| 2003/0210887 | A1 * | 11/2003 | Engle et al. | 386/46 |
| 2008/0209482 | A1 * | 8/2008 | Meek et al. | 725/105 |
| 2008/0270344 | A1 * | 10/2008 | Yurick et al. | 707/2 |
| 2009/0245348 | A1 * | 10/2009 | Sugahara | 375/240.01 |
| 2009/0269037 | A1 * | 10/2009 | Mukaide et al. | 386/105 |
| 2009/0299748 | A1 * | 12/2009 | Basson et al. | 704/270 |
| 2010/0071014 | A1 * | 3/2010 | Brown et al. | 725/110 |
| 2011/0138433 | A1 * | 6/2011 | Whiteing | 725/114 |

\* cited by examiner

Primary Examiner — William C Vaughn, Jr.
Assistant Examiner — Eileen Adams
(74) Attorney, Agent, or Firm — Patton Boggs LLP (57) ABSTRACT

Embodiments of the disclosed invention include an apparatus, method, and computer program product for providing a video source with a secondary audio source. For example, in one embodiment, a method is disclosed that includes receiving a broadcast signal from a first source, the broadcast signal includes a video component and a first audio component. The method further includes receiving a second audio component from a second source, the second audio component providing audio corresponding to the video component of the broadcast. The method outputs the video component and the second audio component while suppressing the output of the first audio component.

17 Claims, 4 Drawing Sheets

SYSTEM AND METHOD FOR SYNCHRONIZING BROADCAST VIDEO WITH A SECONDARY AUDIO SOURCE

CROSS REFERENCE TO RELATED APPLICATION

The present invention is related to the following patent applications: entitled "System and Method for Broadcasting Video with a Secondary Audio Source", Ser. No. 12/632,164, filed even date hereof, assigned to the same assignee, and incorporated herein in its entirety by reference.

BACKGROUND OF THE INVENTION

With today's technology, a consumer may receive video and/or audio content from a variety of sources. For example, the majority of homes receive nationally televised content from a cable and/or satellite service provider. In some circumstances, a consumer may desire to listen to a local broadcast of an event that it is being nationally televised. For example, a sports fan may desire to listen to a local radio broadcast of a sporting event while viewing the nationally televised broadcast of the sporting event. One option is to physically mute the nationally televised broadcast of the sporting event and turn on a radio to receive a local radio broadcast of the sporting event. However, this option is not desirable because the audio of the local radio broadcast and the video of the nationally televised event are generally not synchronized for one or more reasons. For example, a broadcaster may intentionally delay the video feed of a nationally televised broadcast for censoring purposes. In addition, this option would require the use of two separate devices. Accordingly, certain of the disclosed embodiments provide a system and method for synchronizing broadcast video with a secondary audio source that overcomes one or more of the above identified problems.

SUMMARY

Embodiments of the disclosed invention include a system, method, and computer program product for synchronizing a video broadcast with a secondary audio source. For example, in one embodiment, a method is disclosed that includes receiving a broadcast signal from a first source, the broadcast signal includes a video component and a first audio component; receiving a second audio component from a second source, the second audio component providing audio corresponding to the video component of the broadcast; and outputting the video component and the second audio component while suppressing the output of the first audio component.

In another embodiment, a video receiving device is disclosed that includes a first reception unit for receiving a broadcast signal from a first source, the broadcast signal includes a video component and a first audio component; a second reception unit for receiving a second audio component from a second source, the second audio component providing audio corresponding to the video component of the broadcast; and a processing unit for outputting the video component and the second audio component while suppressing the output of the first audio component.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
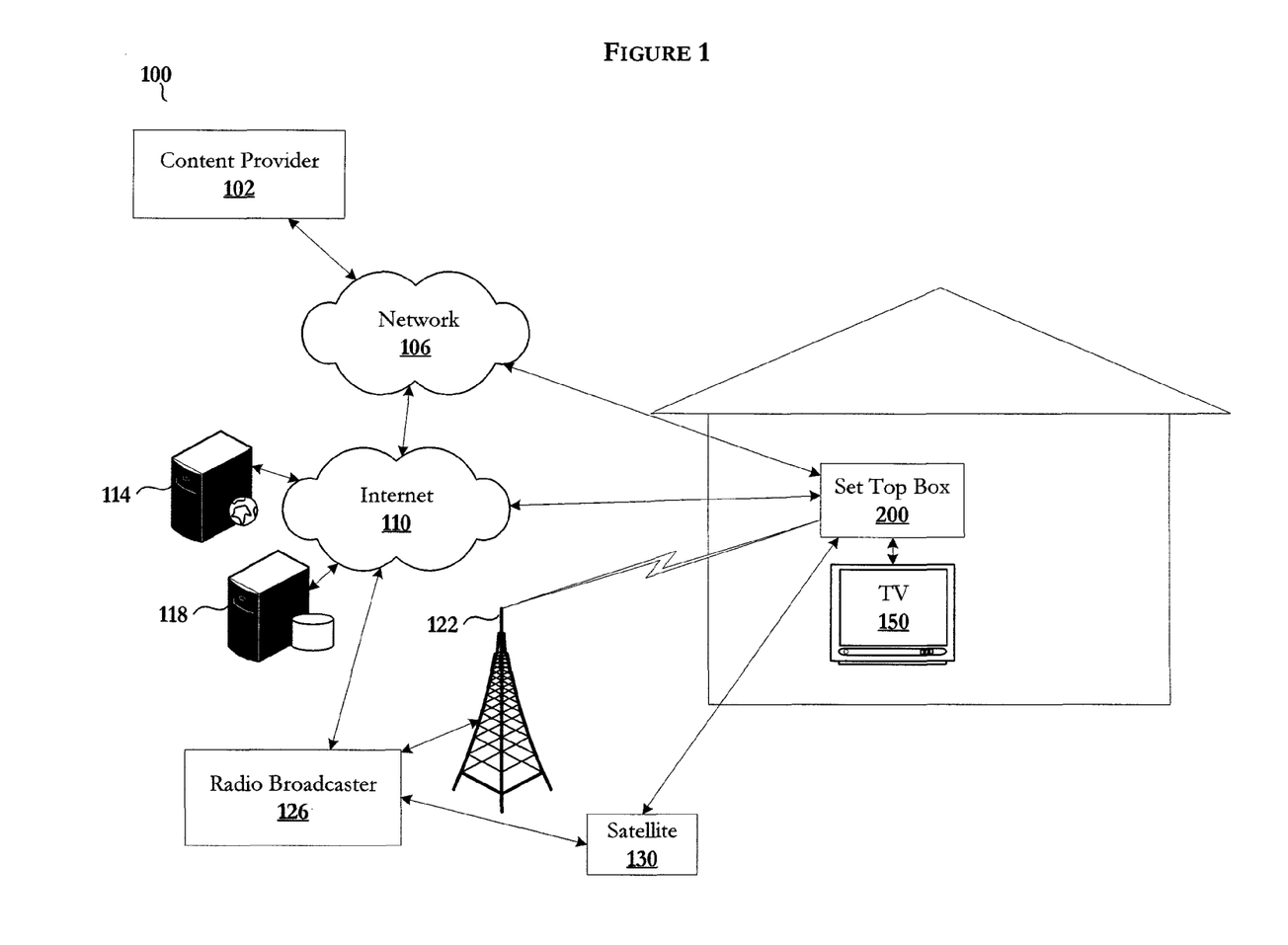
FIG. 1 depicts an embodiment of a network environment in which certain illustrative embodiments may be implemented.

FIG. 1 depicts an embodiment of a network environment 100 in which certain illustrative embodiments may be implemented. In one embodiment, a video receiving device, such as, but not limited to, a set top box 200 is configured to receive video broadcast signals. Set top box 200 outputs video and audio data to a coupled display device, such as, but not limited to, television unit 150. As referenced herein, a video receiving device is any device capable of receiving video signals including, but not limited to, a set top box, a television unit, and/or a personal computer. For example, in other embodiments, a digital cable ready television and/or a television with an integrated digital tuner may be utilized to receive television content without the use of a set top box.

Set top box 200 receives the video broadcast from a content provider 102 via network 106. Content provider 102 may include, but is not limited to, a landline cable television content provider, a satellite television content provider, and/or a local television broadcasting station that broadcasts television content signals over the air. Network 106 may include one or more cable head ends, one or more satellite systems, and/or terrestrial rebroadcasting signal towers. Additionally, network 106 may include a network of cables, such as, but not limited to, copper lines and/or fiber-optic lines.

In addition, in one embodiment, set top box 200 may communicate with one or more data processing systems, such as, but not limited to, a web server 114 and an application server 118 via network 110. In one embodiment, network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). Additionally, network 110 may include other types of data networks, such as, but not limited to, an intranet, a private local area network (LAN), a wide area network (WAN), and a wireless local area network (WLAN).

As will be further described, web server 114 and/or application server 118 may provide audio content corresponding to video content received from content provider 102. For example, in one embodiment, set top box 200 may communicate with web server 114 to search for a secondary audio source associated with a video broadcast. In certain embodiments, set top box 200 may be configured to automatically search for a secondary audio source using key words associated with a video broadcast program. In other embodiments, set top box 200 may be configured to enable a user to manually search for a secondary audio source. For instance, in one embodiment, set top box 200 may include an Internet browser application for enabling a user to manually search for a secondary audio source associated with a video broadcast. For example, if a user prefers local play-by-play announcers for a nationally televised sporting event, the user may visit a website (e.g., LSUsports.net) to retrieve a local Internet broadcast of the sporting event.

In addition, in one embodiment, set top box 200 may also receive audio signals over the air from a radio broadcaster 126 via one or more terrestrial towers 122. In one embodiment, radio broadcaster 126 may be a local radio station that broadcasts local sporting events. In certain embodiments, set top box 200 may include an antenna for receiving the radio signals from radio broadcaster 126. Additionally, in some embodiments, set top box 200 may be configured to receive a radio broadcast via satellite 130 (e.g., XM satellite radio) from radio broadcaster 126.

Figure 2:
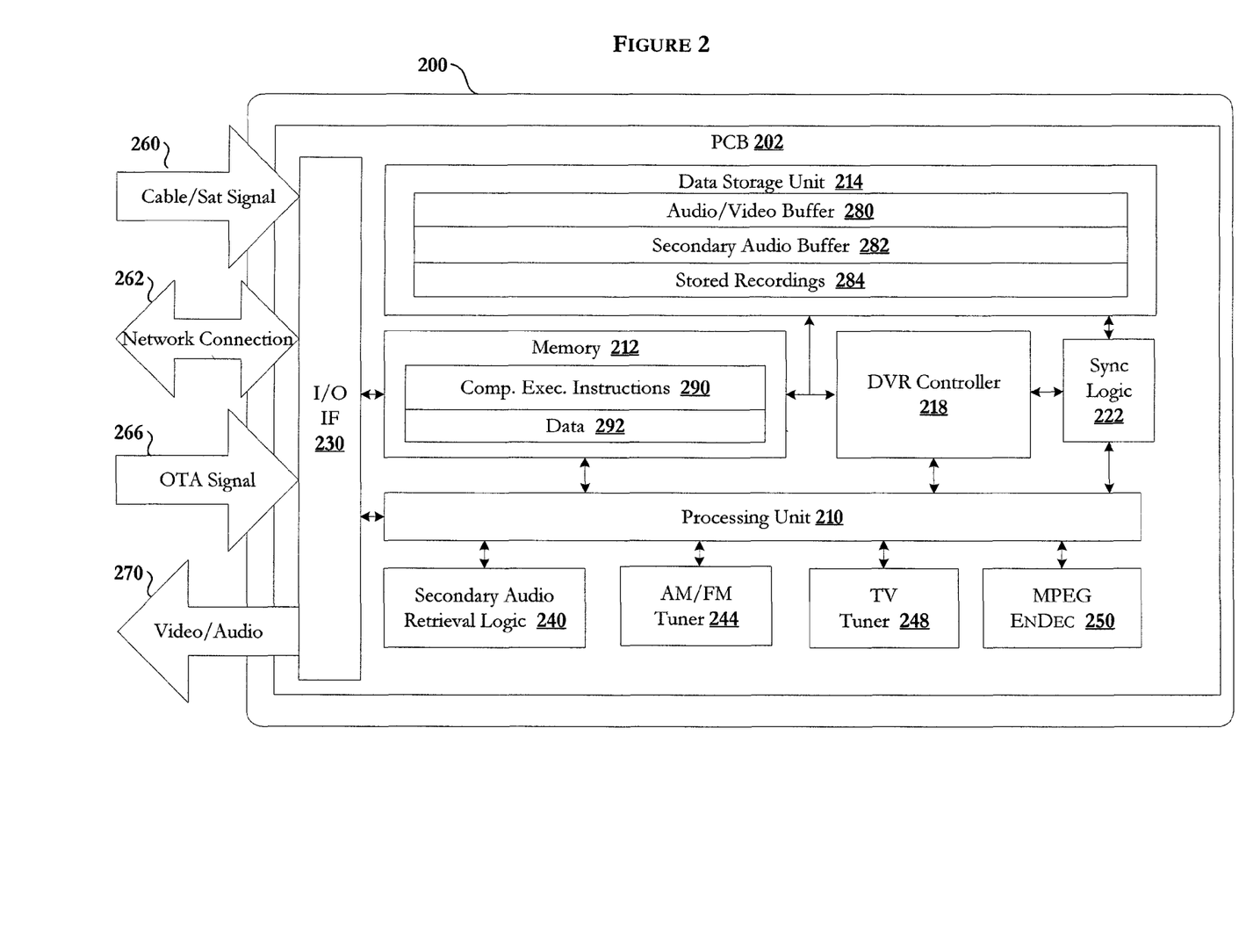
FIG. 2 depicts an embodiment of a set-top box in accordance with certain embodiments of the invention.

FIG. 2 depicts an embodiment of set top box 200 in accordance with certain of the disclosed embodiments. In one embodiment, set top box 200 includes a printed circuit board (PCB) 202. In some embodiments, printed circuit board 202 may be a motherboard that mechanically supports and electrically connects electronic components of set top box 200, such as, but not limited to, a processing unit 210, memory 212, a set of input/output (I/O) interfaces 230, and a data storage unit 214, using conductive pathways, or traces, etched from copper sheets laminated onto a non-conductive substrate.

In one embodiment, the set of input/output interfaces 230 may include an input cable connection, such as, but not limited to, a coaxial cable connector and/or a high-definition multimedia interface (HDMI) connection, for receiving cable/satellite signals 260. Cable/satellite signals 260 may include, but is not limited to, cable television signals and/or XM satellite radio signals. In addition, in a preferred embodiment, the set of input/output interfaces 230 also include an Ethernet connection for providing a wired network connection 262 to network 110. Alternatively, or in addition to, in some embodiments, the set of input/output interfaces 230 may include a wireless communication component for providing a wireless network connection to network 110. Additionally, in certain embodiments, the set of input/output interfaces 230 may include an antenna for receiving over the air (OTA) signals 266. In some embodiments, OTA signals 266 may include over the air television broadcasts signals and/or AM/FM radio signals. Further, the set of input/output interfaces 230 may also include an output connection for outputting video and audio signals 270 to a display device, such as, but not limited to, a television unit.

In certain embodiments, the received data may be processed by processing unit 210. In some embodiments, processing unit 210 may route the data to the appropriate component of set top box 200 for further processing and/or storage. Processing unit 210 may comprise one or more single or multi-core processors including, but not limited to, a central processing unit (CPU), a microprocessor, a graphics processing unit (GPU), and/or a digital signal processor for executing computer instructions. In some embodiments, processing unit 210 may be utilized to perform a specific task, such as, but not limited to, graphics rendering and/or digital signal processing.

In addition, in certain embodiments, set top box 200 includes memory 212. In one embodiment, memory 212 may be volatile memory. Volatile memory is memory that requires power to maintain stored information. For example, in some embodiments, memory 212 may be random access memory (RAM). Random access memory stores currently executing instructions 290 and/or other data 292 utilized by an operating system, software application and/or other components of set top box 200. For instance, as will be further described, in one embodiment, computer executable instructions 290 may include instructions for outputting the incoming video component of a broadcast signal and audio from a secondary source while suppressing the output of audio component associated with the broadcast signal.

Additionally, in a preferred embodiment, set top box 200 includes a non-volatile data storage device, such as, but not limited to, data storage unit 214. Data storage unit 214 may include one or more data storage units. For example, in one embodiment, data storage unit 214 may be one or more hard disk drives. In other embodiments, data storage unit 214 may be flash memory, such as, but not limited to, an xD (extreme Digital) card, SD (Secure Digital) card, or mini SD card. In some embodiments, data storage unit 214 may be removable and/or an interchangeable with other devices.

In one embodiment, data storage unit 214 may store computer executable instructions, such as, but not limited to, software applications. In addition, in some embodiments, data storage unit 214 may store other types of data including, but are not limited, audio/video buffer 280, secondary audio buffer 282, and stored recordings 284. In one embodiment, audio/video buffer 280 may store incoming video and audio data that is currently being broadcast. In addition, secondary audio buffer 282 may store incoming audio data received from a second source, such as, but not limited to, web server 114 and/or radio broadcaster 126.

Additionally, set top box 200 may include a digital video recorder (DVR) controller 218 for recording, storing, organizing, and retrieving the stored recordings 284. In one embodiment, digital video recorder 218 may also handle the buffering of live video and audio. In these embodiments, digital video recorder 218 may retrieve the buffered video and secondary audio component in response to receiving a rewind request (i.e., playing back a live broadcast). In one embodiment, digital video recorder 318 synchronizes the retrieved video and secondary audio component at a particular playback point and outputs the video and the secondary audio component beginning at the particular playback point.

In addition, in some embodiments, digital video recorder controller 218 may include logic and/or computer executable instructions for presenting a user interface for enabling a user to select an audio component for playback with the video component. For example, in one embodiment, digital video recorder controller 218 may enable a user to playback a video file with the original broadcast audio or playback the video file using a secondary audio file.

In certain embodiments, set top box 200 may include a TV tuner 248 and an MPEG encoder/decoder 250. In one embodiment, TV tuner 248 is an ATSC (Advanced Television Systems Committee) tuner. An ATSC tuner is a device that is used in the reception of digital television signals (DTV), including, but not limited to, high definition television (HDTV) signals, standard definition television (SDTV) signals, data broadcasting, multi-channel surround-sound audio, and satellite direct-to-home broadcasting. In addition, TV tuner 248 may decompress and demodulate the inbound television signals. Additionally, in some embodiments, TV tuner 248 may convert analog television signals broadcasted over the air to a digital signal that can be manipulated, such as, but not limited to, media reformatting, for viewing on a particular television set.

MPEG encoder/decoder 250 may be utilized to encode an analog television signal into MPEG format and/or decode a MPEG format signal for generating a viewable signal. MPEG encoder/decoder 250 may support one or more standards, such as, but not limited to, MPEG-2. MPEG-2 is a standard for the generic coding of moving pictures and associated audio information. MPEG-2 is widely used for digital television signals that are broadcast over-the-air, by cable, and by direct broadcast satellite TV systems.

Additionally, in certain embodiments, set top box 200 may include secondary audio retrieval logic 240. As referenced herein, logic is defined as hardware, software, and/or a combination thereof. In some embodiments, secondary audio retrieval logic 240 may be utilized to automatically search for a secondary audio source using key words associated with a video broadcast program. For example, in one embodiment, secondary audio retrieval logic 240 may query a search engine using a title associated with a video broadcast program for locating a corresponding audio broadcast. In another embodiment, secondary audio retrieval logic 240 may be configured by a user to retrieve a secondary audio source from a predetermined location. For example, a user may have a subscription with a particular service that provides audio broadcasts of sporting events associated with a particular team.

In other embodiments, secondary audio retrieval logic 240 may be configured to enable a user to manually search for a secondary audio source. As stated above, set top box 200 may include an Internet browser application for enabling a user to manually search and retrieve a secondary audio source associated with a video broadcast. Additionally, in some embodiments, secondary audio retrieval logic 240 may include logic for enabling a user to manually search and/or configure set top box 200 to retrieve audio signals from a local radio broadcasting station and/or from a satellite radio provider. For instance, in some embodiments, set top box 200 may include an AM/FM tuner 244 for retrieving and decoding AM/FM radio signals from a predetermined radio frequency.

Additionally, in some embodiments, set top box 200 may include synchronization logic 222. In one embodiment, synchronization logic 222 may be configured to output the video component of a television broadcast signal along with a secondary audio source while suppressing the output of the original audio component associated with the television broadcast signal. In a preferred embodiment, synchronization logic 222 is configured to synchronize the video component of a television broadcast signal with a secondary audio source. For instance, in one embodiment, synchronization logic 222 may include logic and/or computer executable instructions for enabling a user to manually synchronize the video component of the television broadcast signal with the secondary audio source. For example, in one embodiment, a user may manually pause the output of either the video component or the secondary audio source and resume play when the video component and the secondary audio component are aligned.

In other embodiments, synchronization logic 222 may include logic and/or computer executable instructions for dynamically synchronizing a video component of a television broadcast signal with a secondary audio source using data markers located in the video component and the secondary audio component. As referenced herein, a data marker is a signal and/or data stream that indicates a particular event and/or time reference associated with the broadcast program. For instance, in one embodiment, the television broadcast signal and the secondary audio source may include data markers for indicating a beginning of a program, a commercial break, and/or the end of a commercial break. In these embodiments, synchronization logic 222 may dynamically synchronize the video component of a broadcast signal with a secondary audio source by aligning the data markers.

Alternatively, in some embodiments, synchronization logic 222 may include executable instructions for recognizing speech/words in the audio associated with the broadcast signal and speech/words in the audio from a secondary audio source for synchronizing the video associated with the broadcast signal with the audio from the secondary audio source. For example, if the broadcast signal contained audio and video for a sporting event, synchronization logic 222 may be configured recognize the words to the National Anthem in both the audio associated with the broadcast signal and the audio from the secondary audio source for synchronizing the video associated with the broadcast signal with the audio from the secondary audio source.

Additionally, in some embodiments, synchronization logic 222 may be configured to switch between outputting the original audio source associated with the broadcast signal and outputting the secondary audio source. For example, in one embodiment, synchronization logic 222 may be configured to receive manual input from a user to switch between outputting the original audio source and outputting the secondary audio source. In other embodiments, synchronization logic 222 may be configured to dynamically switch between outputting the original audio source and outputting the secondary audio source during commercial breaks. For instance, in some embodiments, a user may desire to listen to the commercials (e.g., Super Bowl commercials) using the original audio component of the broadcast signal. Further, in some embodiments, a user may have a subscription with a cable/satellite provider to receive a local audio broadcast (i.e., a secondary audio source) along with a broadcast signal containing a video component and an original audio component. In these embodiments, a network broadcaster may require that the original audio component be played during a commercial break to satisfy an advertisement agreement.

Figure 3:
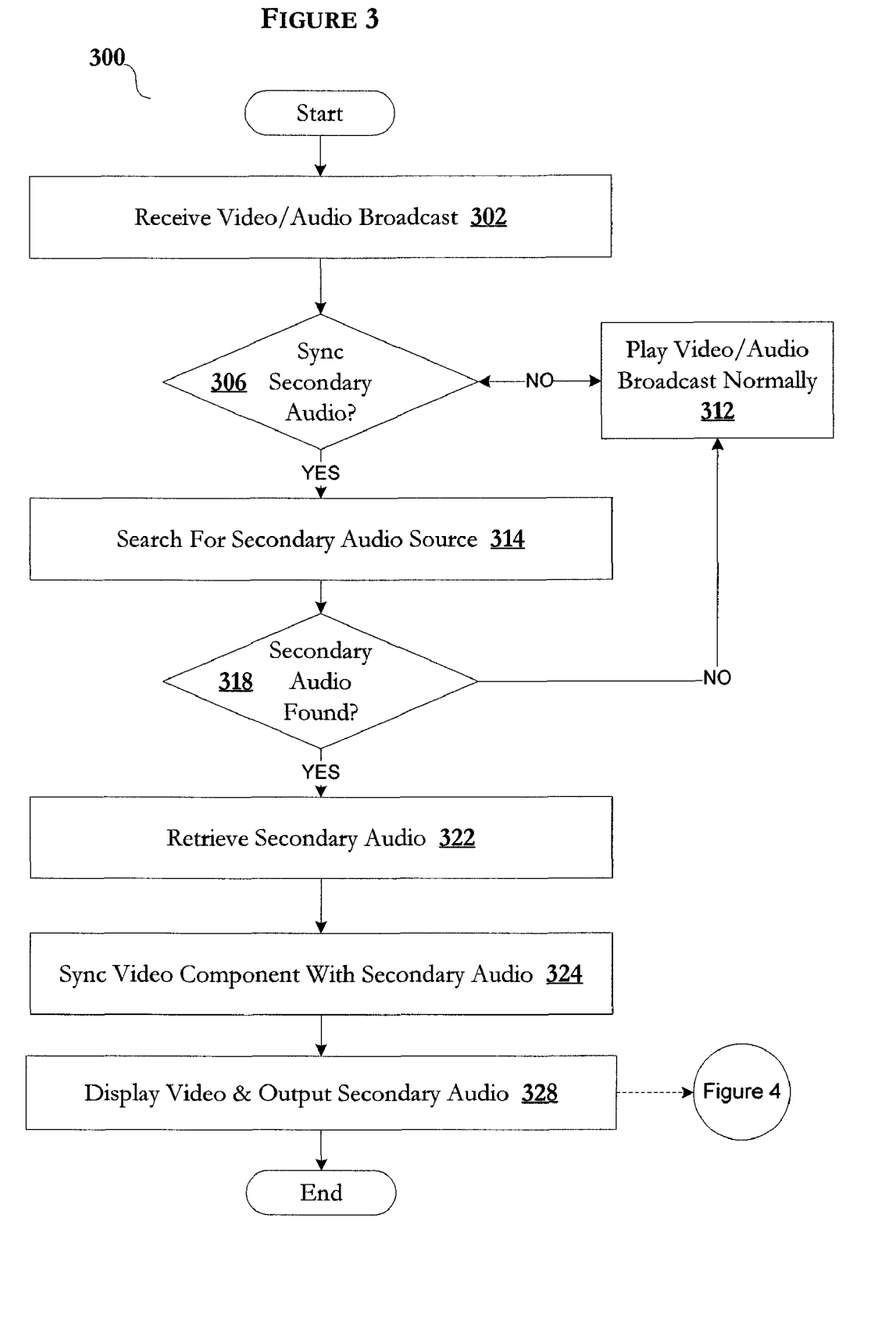
FIG. 3 depicts an embodiment of a process for synchronizing a video broadcast with a secondary audio source in accordance with certain embodiments of the invention.

With reference now to FIG. 3, a process 300 for synchronizing a video broadcast with a secondary audio component is presented in accordance with certain of the disclosed embodiments. Process 300 may be executed by a video receiving device, such as, but not limited to, set top box 200. In one embodiment, process 300 begins, at step 302, by receiving a broadcast signal containing a video component and an audio component associated with a particular program. In one embodiment, process 300, at step 306, determines whether the user desires to search for a secondary audio source. For example, in one embodiment, the process may retrieve a user configuration file to determine whether the user desires to search for a secondary audio source corresponding to the particular program. If the user configuration settings do not indicate a preference for a secondary audio source, the process, at step 312, outputs the video component along with the original audio component associated with the particular program. In one embodiment, the process may continuously and/or periodically monitor for a user request to switch between the original audio component and a secondary audio component. In other words, in certain embodiments, the video receiving device may be configured to enable a user to search for a secondary audio component at any point during a broadcast and switch to the secondary audio component.

If the process, at step 310, determines that a user desires to receive a secondary audio source, the process, at step 314, searches for the secondary audio source. As stated previously, this may be performed dynamically by querying a search engine and/or database over network 110. Alternatively, in some embodiments, a user may manually configure the video receiving device to retrieve a secondary audio source from a predetermined location/address. For example, the user may tune the video receiving device to a particular local radio broadcasting station frequency to retrieve a local radio broadcast signal. Alternatively, the user may preconfigure the video receiving device to retrieve a secondary audio source from a particular XM satellite provider and or from a particular Web site. Additionally, in some embodiments, the video receiving device may include computer executable instructions for presenting a user interface that enables a user to manually search for a secondary audio source.

In one embodiment, if the process, at step 318, identifies a secondary audio source associated with the video component of a broadcast signal, the process, at step 322, retrieves the secondary audio component from the second source. In one embodiment, the process may receive manual input from a user confirming that a secondary audio source has been identified and/or for selecting a secondary source from a list of available audio sources. If the process cannot locate a secondary audio source corresponding to the video component, the process, at step 312, outputs the video component along with the original audio component associated with the particular program.

At step 324, the process synchronizes the video component of the broadcast signal with the secondary audio component. For example, as described above, the process may dynamically synchronize the video component with the secondary audio component using data markers associated with each signal. Alternatively, in some embodiments, the process may receive manual input from a user for assisting in synchronizing the video component with the secondary audio component. The process outputs the synchronized video component and the secondary audio component to a display device at step 328, with process 300 terminating thereafter. In other embodiments, process 300 may continue on to FIG. 4.

Figure 4:
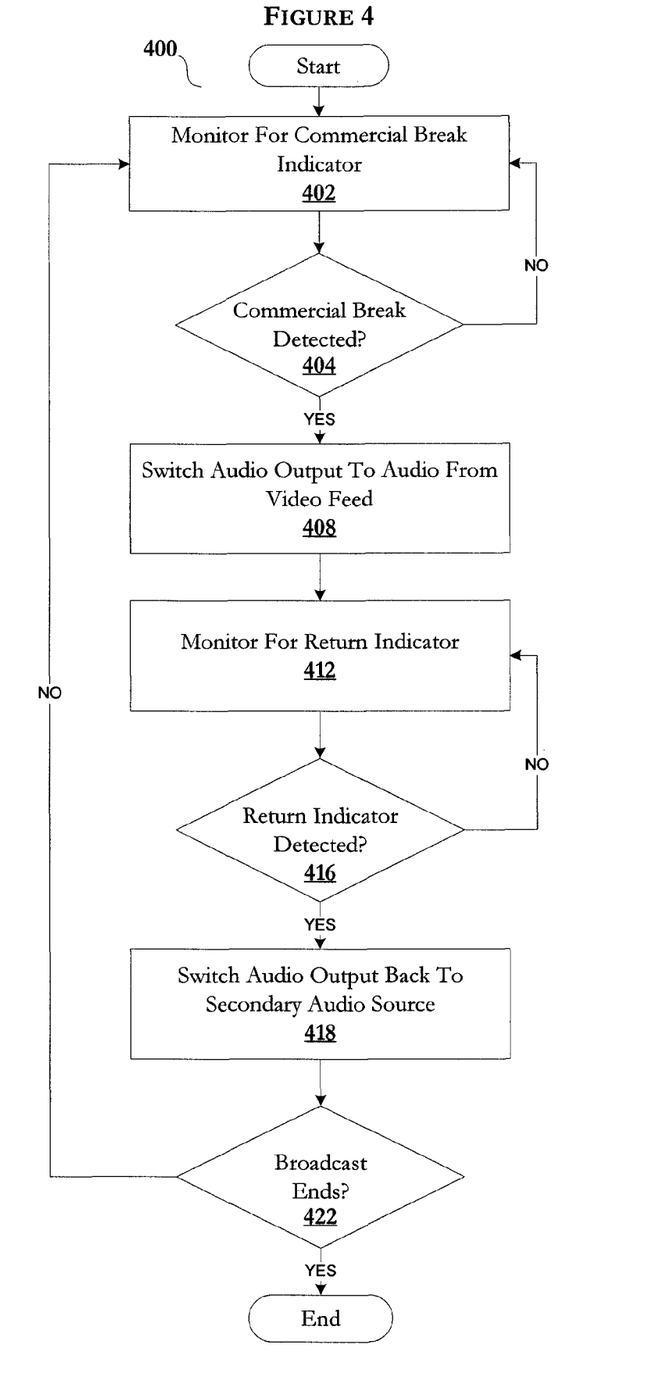
FIG. 4 depicts an embodiment of a process for switching between audio associated with a video broadcast and a secondary audio source in accordance with certain embodiments of the invention.

FIG. 4 presents a process 400 process for switching between audio associated with a video broadcast and a secondary audio source in accordance with certain of the disclosed embodiments. Process 400, at step 402, monitors the video broadcasting for identifying a commercial break indicator. A commercial break indicator may be a signal or data stream indicating that the live feed is about to end or has ended. In one embodiment, if the process, at step 404, identifies a commercial break indicator in the video programming, the process, at step 408, switches from outputting the secondary audio source to outputting the original audio component associated with the video broadcast signal.

The process monitors the video broadcast signal for identifying a return indicator that indicates the end of a commercial break at step 412. In response to identifying a return signal at step 416, the process, at step 418, switches from outputting the original audio component associated with the video broadcast signal to outputting the secondary audio source. At step 422, the process determines whether the particular program associated with the video broadcast has ended. If the program has not ended, process 400 returns to step 402. If the particular program associated with the video broadcast has ended, process 400 terminates.

Accordingly, the above disclosure enables a system and method for providing a secondary audio source with a video component having a first audio component. The above disclosure describes certain embodiments of the claimed invention and is not intended to limit the scope of the claimed invention. In addition, the disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions, hardware components, and/or any combination thereof. In addition, the flowchart and block diagrams in the figures illustrate the architecture, functionality, and operation of possible implementations of systems, methods and computer program products according to various embodiments of the claimed invention. In this regard, each block in the flowchart or block diagrams may represent a module, segment, or portion of code, which may include one or more executable instructions for implementing the specified logical function (s). In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

I claim:

1. A method for providing a video source with a secondary audio source, the method comprising:
receiving, via a video receiving device, a broadcast signal from a first source, the broadcast signal including a video component and a first audio component;

receiving, via the video receiving device, a second audio component from a second source, the second audio component providing audio corresponding to the video component of the broadcast;
synchronizing the second audio component to the video component, wherein synchronizing the second audio component to the video component includes synchronizing a matching a set of words found in both the second audio component and the first audio component;
outputting the video component and the second audio component;
storing the video component and the second audio component in a data storage unit of the video receiving device;
receiving a rewind request to playback a previous portion of the video component;
retrieving the video component from the data storage unit starting from a playback point;
retrieving the second audio component from the data storage unit starting from the playback point;
synchronizing the retrieved video component with the retrieved second audio component at the playback point by matching a set of words found in both the second audio component and the first audio component; and
outputting the synchronized video component and the second audio component beginning at the playback point.

2. The method of claim 1, wherein the video receiving device is a set top box.

3. The method of claim 1, wherein the video receiving device is a television.

4. The method of claim 1, further comprising:
monitoring the video component for identifying a starting point of a commercial break;
responsive to identifying a starting point of a commercial break, outputting the video component and the first audio component while suppressing the output of the second audio component;
monitoring the video component for identifying an end point of the commercial break; and
responsive to identifying the end point of the commercial break; outputting the video component and the second audio component while suppressing the output of the first audio component.

5. The method of claim 1, further comprising receiving user input to synchronize the second audio component to the video component.

6. The method of claim 1, further comprising synchronizing the second audio component to the video component using data markers located in the video component and the second audio component.

7. The method of claim 1, further comprising receiving the second audio component over the air from a local radio broadcast.

8. The method of claim 1, further comprising receiving the second audio component from an Internet source.

9. The method of claim 1, further comprising:
automatically querying an Internet search engine for the second audio component using key words associated with a subject of the broadcast signal; and
outputting the video component and the first audio component in response to being unable to locate the second audio component.

10. The method of claim 1, further comprising:
presenting a user interface for enabling a user to manually search for the second source that is broadcasting the second audio component corresponding to the video component of the broadcast;
responsive to the user locating the second source that is broadcasting the second audio component;
receiving a source identifier associated the second source from the user;
retrieving the second audio component using the source identifier.

11. The method of claim 1, wherein the second audio component from the second source is received with the broadcast signal from the first source.

12. A video receiving device comprising:
memory for storing computer executable instructions;
an input/output interface configured to:
receive a broadcast signal from a first source, the broadcast signal including a video component and a first audio component;
receive a second audio component from a second source, the second audio component providing audio corresponding to the video component of the broadcast; and
a processing unit configured to execute the computer executable instructions to:
synchronize the second audio component to the video component, wherein synchronizing the second audio component to the video component includes synchronizing a matching a set of words found in both the second audio component and the first audio component;
output the video component and the second audio component;
store the video component and the second audio component in a data storage unit of the video receiving device;
receive a rewind request to playback a previous portion of the video component;
retrieve the video component from the data storage unit starting from a playback point;
retrieve the second audio component from the data storage unit starting from the playback point;
synchronize the retrieved video component with the retrieved second audio component at the playback point by matching a set of words found in both the second audio component and the first audio component; and
output the synchronized video component and the second audio component beginning at the playback point.

13. The video receiving device of claim 12, wherein the processing unit is further configured to:
monitor the video component for identifying a starting point of a commercial break;
responsive to identifying a starting point of a commercial break, output the video component and the first audio component while suppressing the output of the second audio component;
monitor the video component for identifying an end point of the commercial break; and
responsive to identifying the end point of the commercial break, output the video component and the second audio component while suppressing the output of the first audio component.

14. The video receiving device of claim 12, further comprising a memory component that stores executable instructions for querying an internet search engine for identifying the second source and for retrieving the second audio component.

15. The video receiving device of claim 12, further comprising:

a recorder module that that is configured to control a recording the video component, first audio component, and the second audio component; and a data storage unit for storing the recording.

16. The video receiving device of claim 12, wherein the second source is an AM/FM tuner.

17. A computer program product comprising a computer usable non-transitory medium having a computer readable program code embodied therein, said computer readable program code comprising instructions to:

receive a broadcast signal from a first source, the broadcast signal including a video component and a first audio component;

receive a second audio component from a second source, the second audio component providing audio corresponding to the video component of the broadcast;

synchronize the second audio component to the video component, wherein synchronizing the second audio component to the video component includes synchronizing a matching a set of words found in both the second audio component and the first audio component;

output the video component and the second audio component;

store the video component and the second audio component in a data storage unit of the video receiving device;

receive a rewind request to playback a previous portion of the video component;

retrieve the video component from the data storage unit starting from a playback point;

retrieve the second audio component from the data storage unit starting from the playback point;

synchronize the retrieved video component with the retrieved second audio component at the playback point by matching a set of words found in both the second audio component and the first audio component; and output the synchronized video component and the second audio component beginning at the playback point.

* * * * *